United States Patent [19]

Possati et al.

[11] 4,329,782
[45] May 18, 1982

[54] GAUGE FOR CHECKING SIZES OF MECHANICAL PARTS

[75] Inventors: Mario Possati; Guido Golinelli, both of Bologna; Narciso Selleri, Monteveglio, all of Italy

[73] Assignee: Finike Italiana Marposs, S.p.A., S. Marino di Bentivoglio, Italy

[21] Appl. No.: 171,161

[22] Filed: Jul. 22, 1980

[30] Foreign Application Priority Data

Jul. 24, 1979 [IT] Italy .................................. 3465 A/79

[51] Int. Cl.³ .............................................. G01B 7/12
[52] U.S. Cl. .............................. 33/147 K; 33/148 H; 33/147 N; 33/172 E; 33/178 E
[58] Field of Search ............ 33/178 R, 178 E, 178 F, 33/147 K, 172 R, 172 B, 172 E, 147 N, 143 L, 174 P, 174 L, 148 R, 149 J

[56] References Cited

U.S. PATENT DOCUMENTS 1,928,457  9/1933  Mershon et al. .................. 33/172 E
3,119,187  1/1964  Meyer .............................. 33/147 K

FOREIGN PATENT DOCUMENTS 892913  7/1979  United Kingdom ............ 33/178 R

Primary Examiner—Harry N. Haroian
Attorney, Agent, or Firm—Stevens, Davis, Miller & Mosher

[57] ABSTRACT

A gauge for checking sizes of mechanical parts, particularly a plug gauge having a support, two measuring arms movable with respect to the support and a transducer for providing a signal responsive to the mutual position of the measuring arms. The measuring arms have tubular end sections defining transversal holes for housing stems carrying feelers for contacting the surface of the part to be checked. Screws coupled with threaded holes axially obtained in the tubular end sections adjustably lock the stems.

5 Claims, 3 Drawing Figures

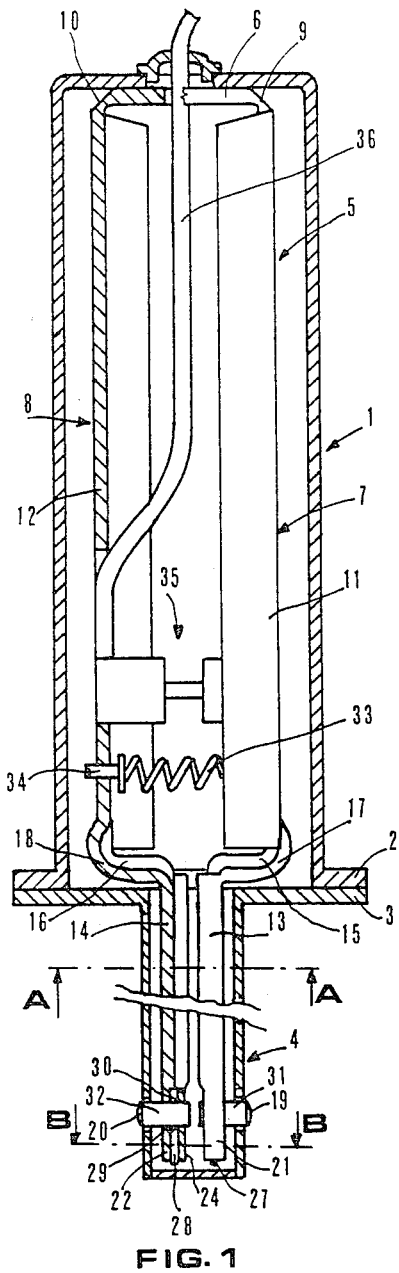
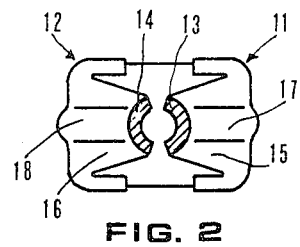
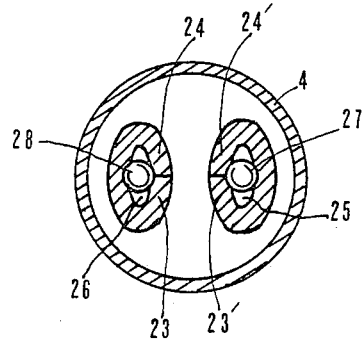

GAUGE FOR CHECKING SIZES OF MECHANICAL PARTS

The present invention relates to a gauge for checking linear sizes of mechanical parts with a support, a fulcrum device coupled to the support, a movable measuring arm coupled to the fulcrum device, a feeler, an adjustment and locking device, for adjusting and locking the feeler with respect to the measuring arm, the adjusting and locking device including a stem or pin housed within a transversal hole of the measuring arm and a screw adapted to cooperate with the stem, and detecting means for detecting the position of the measuring arm.

In conventional gauges the measuring arms have, generally, square, rectangular or circular cross-sections and present at one end a hole for securing the feeler to the arm. The feeler usually includes an insert of wear resisting material, for example an industrial diamond, supported by a stem. The stem is inserted within the relevant hole of the arm, is axially positioned within this hole and is fixed with respect to it, for example, by means of a lock screw inserted through a further hole of the arm communicating with the hole housing the stem.

Another system used for fixing the stem with the feeler to the arm includes making a milling cut on the arm surface, along a direction parallel to the axis of the hole for the stem, in such a way that the milling cut communicates with the hole for the stem. A screw is coupled to the two arm positions divided by the milling cut and by tightening this screw the two portions are approached through the deformation of the hole and the stem is fixed to the arm by interference fit.

The measuring arms of gauges for the size checking of small holes are slender and the above mentioned fixing systems cannot always be used due mainly to the limited thickness of the arms.

The technical problem the present invention intends to solve is that of providing a gauge including a device for adjusting and fixing the feelers to the measuring arms which is adaptable even for gauges for checking the sizes of small holes.

An object of the present invention is that of realizing inexpensive measuring arms and devices for adjusting and fixing the feelers which may be easily manufactured by common machine tools.

The technical problem is solved by a gauge wherein, according to the invention, the measuring arm includes a portion having substantially the shape of a straight tube, the screw being axially arranged within the internal hole of the portion.

FIG. 1 is a partly in section elevational view of the preferred embodiment of the invention, relating to a manual plug-gauge, for checking holes having circular cross-sections;

FIG. 2 shows a simplified cross-sectional view taken on line 2—2 of FIG. 1 of a detail of the gauge of FIG. 1; and FIG. 3 is a cross-sectional view taken on line 3—3 of FIG. 1, of the manual plug-gauge.

With reference to FIG. 1, the plug gauge includes a cylindrical handle 1, for inserting the plug into the hole to be checked. A flange 2 connects handle 1 with a flange 3 of a cylindrical nose-piece 4 for centering the gauge within the hole to be checked. The connection of handle 1 with nose-piece 4 is achieved by screws not visible in the figures.

Handle 1 and nose-piece 4, which are hollow internally, define a chamber—having a longitudinal axis—which houses a measuring set 5 made of a single piece of pressed or stamped plate.

Measuring set 5 includes an upper portion 6, with substantially rectangular contour, for coupling measuring set 5 to handle 1 by means of screws, not visible in the figures.

Two arms 7, 8 are integrally connected to upper portion 6 through two sections 9, 10 the thickness of which is reduced preferably by flat chamfers. The two sections 9, 10 provide fulcrums for pivotal movement of arms 7, 8, respectively, about axes substantially perpendicular to the above mentioned longitudinal axis.

With reference to FIG. 2, too, each arm 7, 8 has a first portion 11, 12, with channel cross-section, a second portion 13,14 with cross-section having the contour in the form of a circular arc and an intermediate portion 15,16 connecting the first portion and the second portion.

The shape of the cross-section of the second portions 13,14 of arms 7,8 defines concave and convex surfaces connected by flat edges; the convex surfaces are adjacent to the internal surface of nose-piece 4.

Intermediate portions 15,16 have stiffening ribs 17, 18, obtained during the pressing operation of measuring set 5.

Due to the shape of their cross-sections, arms 7,8 offer a considerable resistance to bending stress and this avoids undesired bendings of the arms which influence the accuracy of the measurements performed by the gauge.

Two stems 31, 32 with relevant feelers 19, 20 are coupled respectively to the second portions 13, 14 of arms 7, 8; the shape of the arms in the sections coupled to the stems 31,32 with feelers 19, 20 is tubular. The tubular sections, 21,22, are obtained by bending, for a limited height, the two sides 23,24; 23',24' of the second portions 13,14 along a direction parallel to the longitudinal axis, so as to approach the flat edges of the portions 13,14. The bending of sides 23,24;23',24' is carried out towards the concave surfaces of the second portions 13,14, as shown in FIG. 3.

Each stem 31,32 is housed within holes 29,30 obtained in the tubular sections 21,22; the geometrical axes of holes 29,30 is substantially perpendicular to the longitudinal axis. The tubular shapes of sections 21,22 define holes 25,26 having cross-sections with extended contours, substantially elliptical holes. The shape of these holes 25,26 is at least partially modified by a drilling operation and a subsequent threading operation, in order to house lock screws 27,28, which engage stems 31,32 at points located between guiding holes 29,30, for securing them in the desired position with respect to arms 7,8.

A spring 33, the tension of which can be adjusted by a screw 34, acts on arms 7,8 for determining the contact force of feelers 19,20 against the surface of the hole to be checked. A transducer 35, of the differential transformer type, coupled to arms 7,8 provides an electrical signal responsive to the mutual position of the arms and a processing and indicating group, not shown in the figures, receives this signal through a multipolar cable 36. Cable 36 moreover connects the transducer to an electrical power supply, per se known and not shown in the figures. Spring 33 and transducer 35 are arranged within the chamber portion defined by handle 1.

The shape of the cross-sections of arms 7,8 and in particular the tubular shape of the sections 21,22 for securing stems 31,32 to arms 7,8 permits checking holes having diameters even very small, for example lower than 10 mm, while at the same time providing the necessary stiffness of the arms and a stable but adjustable coupling of feelers 19,20 with respect to arms 7,8.

A variant with respect to the illustrated features foresees to bend sides 23,24; 23',24' on threaded cylindrical cores in order to obtain the tubular sections 21,22 with the internal hole threaded directly during the bending process.

The described gauge may undergo other changes and modifications equivalent from a functional and structural point of view, without departing from the spirit of the invention.

What is claimed is:

1. A gauge for checking linear sizes of mechanical parts, comprising a support, a fulcrum device coupled to the support, a movable measuring arm coupled to the fulcrum device, a feeler, an adjustment and locking device for adjusting and locking the feeler with respect to the measuring arm, the adjusting and locking device including a stem or pin housed within a transversal hole of the measuring arm and a screw adapted to cooperate with the stem, and detecting means for detecting the position of the measuring arm, wherein the measuring arm includes a portion having substantially the shape of a straight tube, a connecting portion, for connecting said portion having substantially the shape of a straight tube with said fulcrum device, the connecting portion defining a member with a surface having a concave side, a convex side and two edges, the portion having substantially the shape of a straight tube being obtained by longitudinally bending an end section of said member to bring together said edges, said screw being axially arranged within the internal hole of said portion having substantially the shape of a straight tube.

2. A gauge according to claim 1, wherein said portion having substantially the shape of a straight tube defines said transversely positioned hole; said axial hole being at least partially threaded for cooperating with said screw for securing the stem to the portion having substantially the shape of a straight tube.

3. A gauge according to claim 2, wherein said connecting portion includes a first section having substantially a channel cross-section, a second section having a cross-section substantially with the form of a circular arc and an intermediate section connecting the first and the second section, the intermediate section including a stiffening rib.

4. A gauge according to claim 1, further comprising a second fulcrum device coupled to the support, a second movable measuring arm coupled to the second fulcrum device, a second feeler and a second adjusting and locking device for adjusting and locking the second feeler with respect to the second measuring arm, wherein the two arms, the fulcrum devices and the support are defined by a single piece made of a stamped plate; the first and second fulcrum devices being defined by two sections connecting the arms with the support, the two sections being lightened by relevant flat chamfers, the detecting means including a differential transformer transducer for detecting the relative position of the two arms.

5. A gauge according to claim 4, for manualy checking circular internal holes, further comprising a handle coupled to the support, a spring acting on the measuring arms for determining the contact forces of the feelers with the surface of the hole to be checked and a nose-piece for centering the gauge with respect to the hole to be checked, the handle and the nose-piece defining an internal chamber for housing said single piece, the spring and the differential transformer transducer being arranged within the chamber portion defined by the handle.

* * * * *